United States Patent [19]

Mollhagen

[11] Patent Number: 4,829,936
[45] Date of Patent: May 16, 1989

[54] LIVESTOCK WORKING SYSTEM

[76] Inventor: Jon D. Mollhagen, Lorraine, Kans. 67459

[21] Appl. No.: 108,898

[22] Filed: Oct. 15, 1987

[51] Int. Cl.⁴ .............................................. A01K 29/00
[52] U.S. Cl. ......................................... 119/82; 119/20
[58] Field of Search ............... 119/20, 82, 98, 99; 280/491 C, 491 D

[56] References Cited

U.S. PATENT DOCUMENTS

| | | | |
|---|---|---|---|
| 2,279,840 | 4/1942 | Robinson et al. | 119/98 |
| 2,935,965 | 5/1960 | Smith | 119/82 |
| 2,991,755 | 7/1961 | Ekren et al. | 119/98 |
| 3,225,744 | 12/1965 | Procter | 119/82 |
| 3,796,191 | 3/1974 | McIntire | 119/82 |
| 3,894,515 | 7/1975 | Plyler | 119/82 |
| 3,929,104 | 12/1975 | Corbin | 119/82 |
| 4,034,716 | 7/1977 | Fleming | 119/82 |
| 4,201,157 | 5/1980 | Lambert | 119/82 |
| 4,250,836 | 2/1981 | Smith | 119/20 |
| 4,303,258 | 12/1981 | Davis | 280/403 |
| 4,321,889 | 3/1982 | Michaelson et al. | 119/82 |
| 4,366,775 | 1/1983 | Tyquin | 119/82 X |
| 4,452,178 | 6/1984 | Nijhuis | 119/20 |
| 4,499,856 | 2/1985 | Hecht et al. | 119/82 |
| 4,566,404 | 1/1986 | Instone et al. | 119/8 |

*Primary Examiner*—Robert P. Swiatek
*Attorney, Agent, or Firm*—Litman, McMahon & Brown

[57] ABSTRACT

An animal working device includes a front enclosure with front and back ends, opposite sides, a base and a superstructure. The front enclosure includes opposite side walls each at a respective side and a gate in one of the sides. A back enclosure includes front and back ends, opposite sides, a base and superstructure. The back enclosure is telescopically received in the front enclosure and is movable between extended and retracted positions with respect thereto. In its extended position, the back enclosure communicates with the front enclosure. An elevation system is provided for raising and lowering the device between a work position on a ground surface and a transport position elevated thereover. A wheeled, retractable undercarriage is mounted on the back end of the front enclosure for raising, lowering and transporting the device.

14 Claims, 3 Drawing Sheets

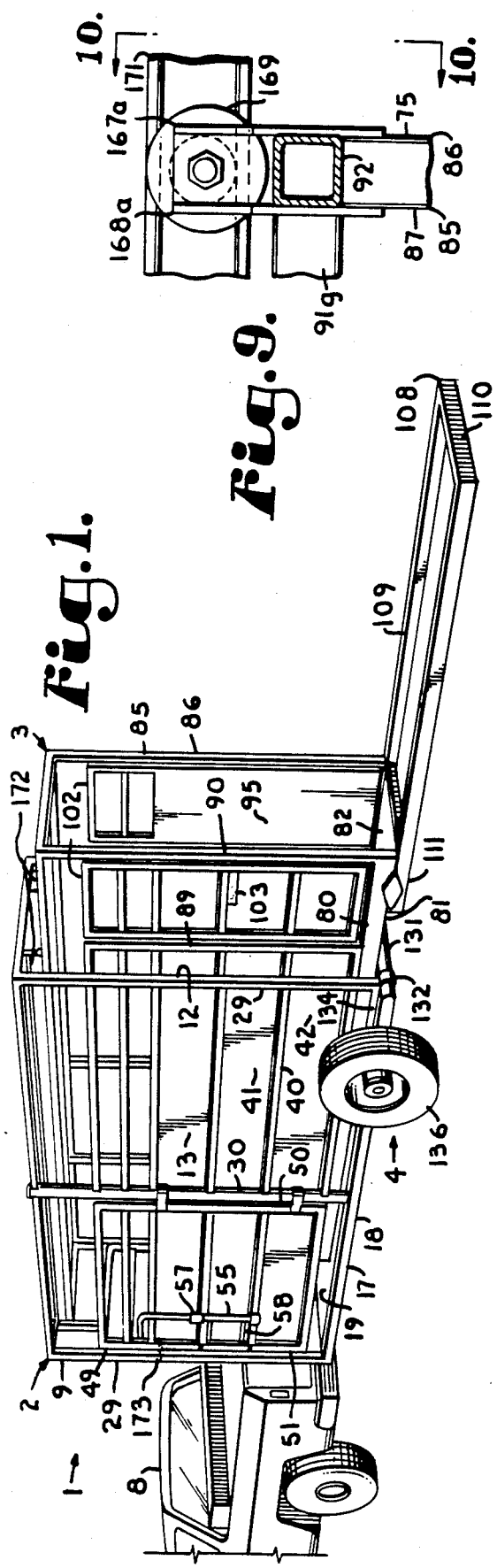

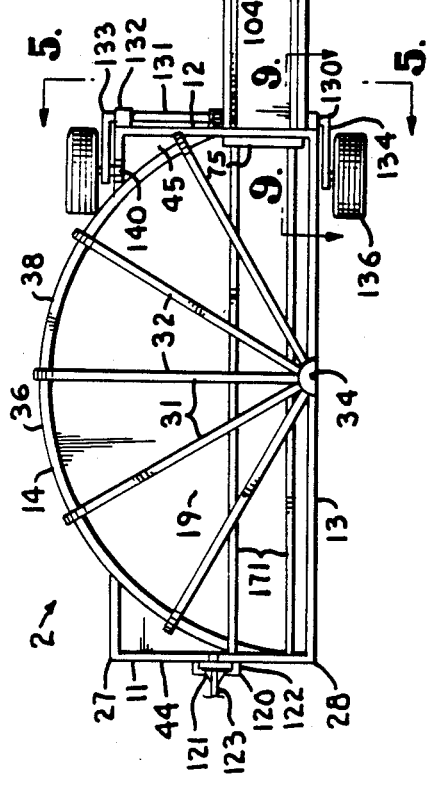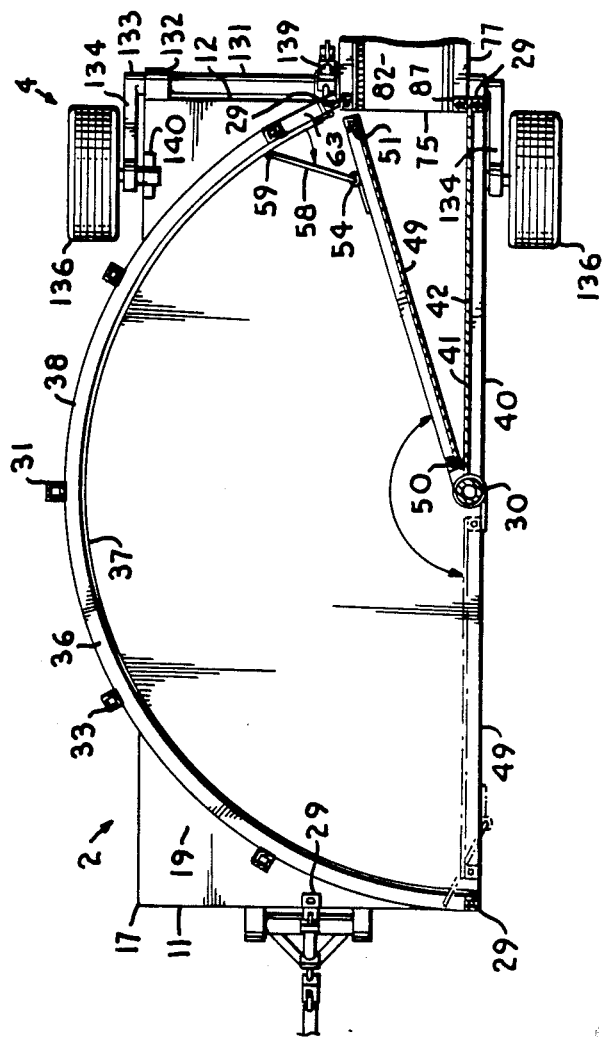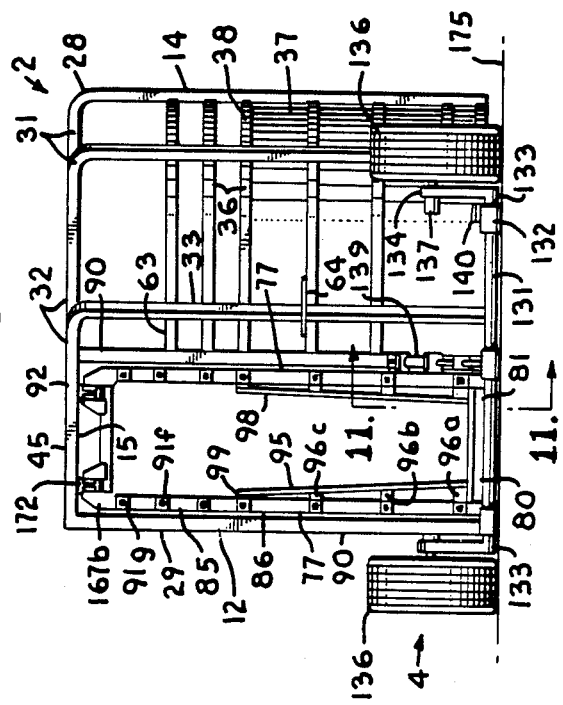

LIVESTOCK WORKING SYSTEM

BACKGROUND OF THE INVENTION

1. Field of the Invention.

The present invention relates generally to animal husbandry, and in particular to a portable device for use in connection with weighing, treating and loading livestock.

2. Description of the Prior Art.

In livestock operations it is often necessary to restrain or direct the animals for palpating, immunization, branding, treatment, weighing, loading, etc. Corrals, loading chutes, alleyways and pens have heretofore been constructed and employed by cow-calf operators, steer operators and large animal veterinarians for these purposes. These structures are often constructed permanently of fence materials, such as stone, barbed wire, wood rails, steel pipe and the like. However, the capital investment required for such permanent structures is often prohibitive to decentralized ranch operations, particularly those that run livestock on relatively small, isolated tracks of grazing land. Furthermore, many ranchers lease rather than own their grazing land, and naturally wish to avoid making permanent, fixed improvements.

A common solution to this problem is to physically transport the animals to a location having the necessary permanent, fixed equipment. However, transporting a herd of large animals tends to be relatively time-consuming and expensive. For example, a round trip from a grazing pasture to a treatment area requires loading, unloading and transporting the animals twice. Naturally, the time and expense associated with transporting livestock herds increases with the distance and the number of animals involved.

A solution to the aforementioned problems is to provide portable livestock working equipment. For example, the Lambert U.S. Pat. No. 4,201,157 discloses a portable animal handling unit with retractable transport wheels and a front elevating assembly. The unit provides catching and holding pens, loading and unloading ramps and animal holding passages and chutes for a variety of animal handling operations. The McIntire U.S. Pat. No. 3,796,191 and the Smith U.S. Pat. No. 4,250,836 also show portable livestock working equipment.

A disadvantage with many prior art portable animal handling devices is that animals resist entering them. For example, straight chutes such as those shown in the McIntire U.S. Pat. No. 3,796,191 and the Fleming U.S. Pat. No. 4,034,716 have essentially constant, relatively narrow widths, even though large animals tend to balk at entering narrow, confining structures. Often it is desirable to provide fence sections that converge towards the entrance to a relatively narrow loading chute or alleyway so that the animals can be funneled into the equipment. For example, the Smith U.S. Pat. No. 4,250,836 shows portable corral configurations with funnels for directing animals into relatively narrow passageways.

A related problem is that large animals can be hazardous to workers trying to direct them into such equipment. Animals that are unaccustomed to confinement frequently balk at entering confining structures and may even panic. In spite of the availability of cattle prods, whips and the like, workers can be kicked, gouged and trampled by the livestock. Many of the prior art animal working structures provide little or no protection from such hazards.

Heretofore, there has not generally been available a livestock working device with the advantages and features of the present invention.

SUMMARY OF THE INVENTION

In the practice of the present invention, an animal working device is provided which includes a front enclosure having a front end and a back end with an opening; straight and convex sides, a base and a superstructure. A straight wall assembly and a gate are provided on the straight side. The gate can be opened to admit animals to the front enclosure, and can be swung through the front enclosure to advance animals therethrough. A convex wall assembly is provided on the convex side. A back enclosure includes open front and back ends, opposite sides, a base and a superstructure. Side wall assemblies are provided at the opposite sides. The back enclosure is telescopically receivable in the front enclosure through the back end opening thereof and is movable between extended and retracted positions. An elevation system is provided for raising and lowering the device between a work position on a ground surface and a transport position above the ground surface. The elevation system includes a pivotable tongue assembly, a wheeled undercarriage movable between extended and retracted positions and a jack assembly movable between extended and retracted positions.

PRINCIPLE OBJECTS OF THE INVENTION

The principle objects of the present invention are: to provide an animal working device; to provide such a device which is portable; to provide such a device which is adapted for working relatively large animals; to provide such a device which includes telescoping front and back enclosures; to provide such a device which may be raised and lowered between a work position on a ground surface and a transport position thereover; to provide such a device which is adaptable for use with other livestock working equipment; to provide such a device which provides an operator with a relatively high degree of protection from the animals; to provide such a device with a relatively large front enclosure into which a group of animals can be guided; to provide such a device which is towable behind a pickup truck; to provide such a device which is economical to manufacture, efficient in operation, capable of a long operating life and particularly well adapted for the proposed usage thereof.

BRIEF DESCRIPTION OF THE DRAWINGS

FIG. 1 is a perspective view of an animal working device embodying the present invention, shown hitched to a pickup truck tow vehicle.

FIG. 2 is a side elevational view of the device showing a jack assembly extended in preparation for telescopically extending a back enclosure from a front enclosure.

FIG. 3 is a side elevational view of the device, shown in a work configuration on a ground surface.

FIG. 4 is a top plan view of the device in its work configuration.

FIG. 5 is a transverse cross-sectional view of the device taken generally along line 5—5 in FIG. 4.

FIG. 6 is a partial top plan view of the device, particularly showing a front enclosure.

FIG. 9 is a fragmentary cross-sectional view of the device, particularly showing a roller assembly and track.

DETAILED DESCRIPTION OF THE PREFERRED EMBODIMENT

I. Introduction

Figure 10:
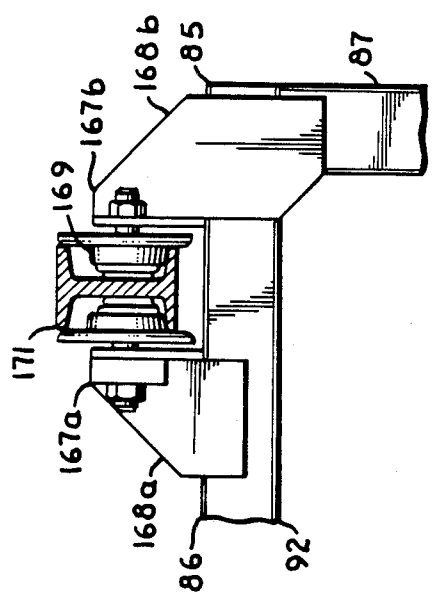
FIG. 10 is a fragmentary cross-sectional view of the device, taken generally along line 10—10 in FIG. 9.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an animal working device embodying the present invention. The device 1 generally comprises a front or first enclosure 2 telescopically receiving a back or second enclosure 3 and a transport and telescoping system. The front enclosure 1 shown and described herein is similar to a piece of animal working equipment generally referred to as a "working tub". The back enclosure 3 shown and described herein is similar to a piece of animal working equipment generally referred to as an "alleyway". However, the present invention is not limited to a combination of these two pieces of animal working equipment. Likewise, the directional references "front", "back", and the like are for reference only and do not limit claims as either end of a device embodying the present invention could be designated its "front" or "back". The device 1 in its transport configuration is adapted for towing by a vehicle such as a pickup truck shown at 8.

II. Front Enclosure

The front enclosure 2 includes front and back ends 11, 12; a straight side 13; and a convex side 14. An opening 15 is formed in the back end 12. A base 17 includes a base frame 18 with a steel plate deck 19 welded thereon. The front enclosure 2 also includes a superstructure 27 with a skeletal framework 28. The superstructure framework 28 includes four upright corner standards 29 and an upright gate post 30 centered along the straight side 13.

A plurality of radius members 31 each having a horizontal leg 32 mounted on a gusset plate 34 mounted on the top of the gate post 30 and a vertical leg 33 fastened to the base 17 are provided at approximately thirty degree intervals (FIGS. 4 and 5). The radius member vertical legs 33 are interconnected by convex side rails 36 that extend at vertically spaced intervals from the front corner standard 29 at the straight side 13 to the rearmost radius member 31. A convex front enclosure side panel 37 is mounted on the inside of the convex side rails 36 and follows their curvature. The convex rails 36 and the convex panel 37 define a convex side wall assembly 38 that encloses the front end 11 and the convex side 14.

Straight side rails 40 extend from the gate post 30 to the rearmost corner standard 29 on the straight side 13 and mount a straight side panel 41 on the inside. The straight rails 40 and the straight panel 41 define a straight side wall assembly 42. Front and back cross members 44, 45 connect the upper ends of the corner standards 29.

The front enclosure 2 includes a main gate 49 with a hinged side 50 hingedly mounted on the gate post 30 and a free side 51. The main gate free side 51 is provided with a cam assembly 54 for protecting the operator from the livestock in the front enclosure 2 by preventing rotation of the main gate 49 in a forward direction. The cam assembly 54 includes a vertical pivot shaft 55 with a handle lever 56 projecting horizontally from its upper end. The pivot shaft 55 is journaled in pipe sleeves 57 mounted on the main gate 49. A cam bracket 58 projects laterally from a lower portion of the pivot shaft 55 and includes a vertical engagement bar 59 which extends slightly beyond the main gate free side 51. An elastomeric return strap 60 biases the cam bracket 58 towards the main gate 49.

An auxiliary front enclosure gate 63 is hingedly mounted on the rearmost radius member 31 and opens inwardly. The auxiliary gate 63 is biased to its closed position in engagement with the rearmost corner standard 29 on the convex side 14 by an elastomeric strap 64.

III. Back Enclosure

The back enclosure 3 includes open front and back ends 75, 76 and opposite sides 77. A back enclosure bas 80 includes a base frame 81 with a back enclosure steel plate deck 82 mounted thereon. A superstructure 85 includes a skeletal framework 86 with front, intermediate, gate post and back standards 87, 88, 89 and 90 respectively on each back enclosure side 77. Horizontal side rails 91a-91g (from the bottom up) extend between the standards 87-90 at vertically spaced intervals and the tops of transversely opposed pairs of standards 87-90 are interconnected by cross members 92.

Steel wall panels 98 are mounted on the side rails 91a-91d to form a pair of opposed, downwardly-converging wall assemblies 99. Spacers 96a-96c space respective side rails 91a-91c inwardly from respective standards 87-89 to provide the downward convergence of the wall assemblies 99.

A pair of opposed back enclosure gates 102 are each hingedly mounted on a respective gate post standard 89 and are selectively secured to a respective back standard 90 by a latch 103. The gates 102 provide access to a passage 95 through the back enclosure 3.

A transverse bar 104 is pivotally mounted on a respective wall assembly 99 and extends most of the way across the passage 95. The transverse bar 104 is adapted to swing rearwardly to permit cattle to pass therethrough, but is braced against swinging in a forward direction to prevent animals from trying to back out of the passage 95. From outside the back enclosure 3 an operator can regulate the flow of animals through the passage 95 with the transverse bar.

An extension base 108 extends rearwardly from the back enclosure back end 76 and includes a pair of longitudinal frame tubes 109 interconnected at their back ends by a cross frame tube 110. The longitudinal frame tubes 109 are welded at their front ends to the back enclosure base frame 81 by fishplates 111.

IV. Transporting ans Telescoping System

A tongue assembly 120 is mounted on the front enclosure front end 11 and includes a transverse pivot tube 121 journaled in a pair of sleeves 122 welded to the base frame 18. An A-frame tongue 123 is mounted on the pivot tube 121 and terminates at a hitch 124. The tongue 123 is raised and lowered by a double-acting fluid power cylinder 125 extending between the tongue 123 and the front corner standard 29 on the convex side 14. The front enclosure 2 is supported at its back end 12 by a wheeled undercarriage 130 including a pivot tube 131 journaled in a plurality of sleeves 132 welded to the front enclosure base frame 18 at the front enclosure back end 12. The pivot tube 131 includes opposite ends 133 each mounting a respective forwardly-extending wheel arm 134 on which a wheel 136 is rotatably mounted. An undercarriage stop pin 137 is mounted on the end of each wheel arm 134 and is selectively receivable in a respective stop pin bracket 140 mounted on the front enclosure base 17 to retain the undercarriage 130 in an extended position as shown in FIGS. 1 and 2.

Figure 11:
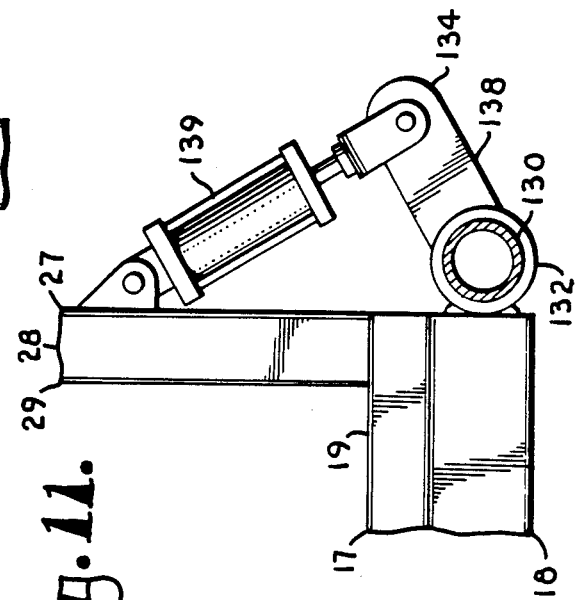
FIG. 11 is a fragmentary cross-sectional view of the device, particularly showing a hydraulic cylinder for raising and lowering a wheeled undercarriage.
Figure 7:
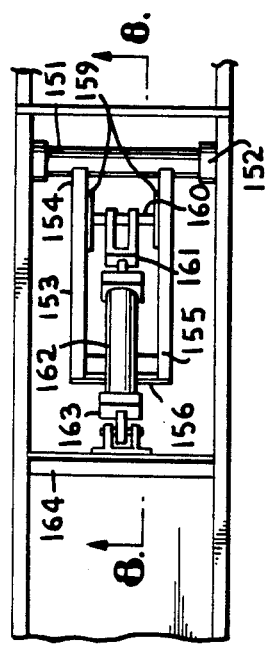
FIG. 7 is a fragmentary detail and plan view of the device, particularly showing the jack assembly.

A pivot tube lever 138 projects rearwardly from the pivot tube 131 and mounts one end of a double-acting fluid power cylinder 139, the other end of which is mounted on the rear corner standard 29 on the convex side (FIG. 11). The cylinder 139 raises and lowers the undercarriage 130 between an extended position as shown in FIGS. 1 and 2 and a retracted position as shown in FIGS. 3 and 5.

A jack assembly 150 is provided adjacent the back enclosure back end 76 and includes a jack assembly pivot tube 151 journaled at its opposite ends in a pair of transversely opposed, inwardly-open sleeves 152 which are mounted on the back enclosure base frame 81. A pair of parallel jack tubes 153 extend at right angles from the pivot tube 151 and are welded thereto at their respective proximate ends 154. At their distal ends 155, the jack tubes 153 are interconnected by a transverse angle member 156.

Figure 8:
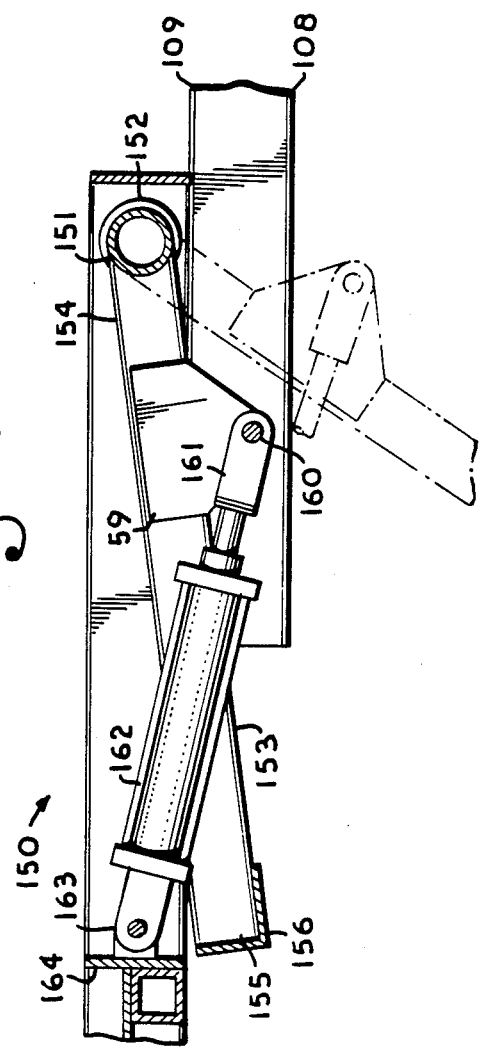
FIG. 8 is a fragmentary, cross-sectional view of the device taken generally along line 8-8 in FIG. 7 and particularly showing the jack assembly.

A pair of jack lever plates 159 are mounted on the insides of the jack tubes 153 between their respective ends 154, 155 in opposed relation and extend downwardly from the jack tubes 153 when the jack assembly 150 is in its extended position (FIG. 8). A cylinder mounting rod 160 extends transversely between the opposed jack lever plates 159 and mounts a respective end 161 of a double-acting fluid cylinder 162, the other end 163 of which is mounted on a transversely extending cross member 164 of the alleyway base frame 81. The jack lever plates 159 maintain the pivotal axis of the cylinder end 161 below the pivotal axis of the pivot tube 151 and the cylinder end 163. Extending and retracting the cylinder 162 thus extends and retracts the jack assembly 150.

The front enclosure 3 is partly supported by two pairs of inside and outside wheel assemblies 167a, 167b that rollingly engage a pair of longitudinal I-beam tracks 171. The tracks 171 are mounted on the radius member 65 horizontal legs 32 and the cross members 44, 45. Rearward travel of the roller assemblies 167a, 167b is limited by a pair of stop plates 172 each mounted on the back end of a respective track. The inside and outside roller assemblies 167a, 167b include inside and outside mounting brackets 168a, 168b mounted on the frontmost cross member 92 of the alleyway superstructure framework 86. Each mounting bracket 168a, 168 mounts a respective roller 169 in rolling engagement with a respective track 46.

The fluid power cylinders 125, 139 and 162 can be either pneumatic or hydraulic. The animal working device 1 can mount a fluid pump powered by, for example, the electrical system of the tow vehicle 8, or by a storage battery on the device 1. Alternatively, hydraulic power can be supplied directly from an external source, such as the tow vehicle 8. As yet another alternative, the cylinders 125, 139 and 162 can be operated by a hand pump.

V. Operation

FIG. 1 shows the animal working device 1 in its transport configuration with the tongue assembly 120 lowered, the undercarriage 130 extended, the jack assembly 150 retracted, and the back enclosure 3 retracted into the front enclosure 2 through the opening 15. In this configuration, the back enclosure front end 75 is suspended by the roller assemblies 167a, 167b from the tracks 171 and the back enclosure back end 76 rests on the deck 19 of the front enclosure 2 adjacent to its back end 12. The back enclosure 3 is preferably retained in the front enclosure 2 by a safety chain 173 looped and secured around standards 29, 87 to avoid its inadvertent extension in transit. The front enclosure main gate 49 is retained in its closed position by swinging the cam bracket 58 rearwardly whereby the handle lever 56 engages the front corner standard 29 on the straight side 13 from the inside. The cam assembly 54 is retained in this position by the return strap 60. Thus configured, the animal working device 1 is towable.

Upon reaching its destination, the animal working device 1 is transformed from a transport configuration to a working configuration by extending the jack assembly 150, whereby the back enclosure 3 is raised above the front enclosure deck 19 (FIG. 2). The safety chain 173 is removed and the pickup truck 8 is then driven forward. Since the jack assembly 150 anchors the back enclosure 3, the roller assemblies 167a, 167b will roll along the tracks 171 as the front enclosure 2 pulls away from the back enclosure 3. Extension of the back enclosure 3 is limited by the abutment stop plates 172 at the back ends of the tracks 171. The stop pins 137 are then slid outwardly to clear the stop pin brackets 140 and the undercarriage 130 is retracted, which of course lowers the front enclosure back end 12 and the back enclosure front end 75 until their respective bases 17, 80 rest on the ground surface 175. The alleyway jack assembly 150 is retracted, lowering the back enclosure back end 176 and the front enclosure front end 11 is lowered with the fluid cylinder 125 so that the entire device 1 rests on the ground surface 171. The sequence for lowering the front enclosure 2 and the back enclosure 3 is not critical, and the present invention is not limited to the aforementioned sequence. For example, all of the power cylinders 125, 139 and 162 could be actuated simultaneously to lower the entire device 1 evenly.

With the device 1 in its operating configuration (FIG. 3), the cam assembly return strap 60 is removed, the cam assembly 54 is rotated from its travel (FIG. 1) position to its operating (FIG. 3) position and the main gate 49 is swung open. The device 1 can be used in combination with fence or rail sections (not shown) to funnel livestock to the main gate 49. The main gate 49 itself can be used to help divert animals into the front enclosure 2.

The front enclosure 2 is capable of holding a number of large animals. From there the animals advance one at a time into the back enclosure passage 95. Preferably an operator gradually swings the main gate 49 into the interior of the front enclosure 2, i.e. in a clockwise direction as shown in FIG. 6. As the main gate 49 swings through the front enclosure 2, the engagement bar 59 of the cam assembly 54 is biased into continuous contact with the convex side wall panel 37 by the return strap 60. Since the distance from the cam assembly engagement bar to the cam assembly pivotal axis is greater than the distance from the convex side wall panel 37 to the cam assembly pivotal axis, the cam assembly engagement bar 59 is jammed tightly into the side wall convex panel 37 if force is applied to the main gate 49 in a counterclockwise direction as viewed in FIG. 6. Hence, an operator can safely advance the main gate 49 whereby animals are urged out of the front enclosure 2 into the back enclosure 3 with the protection of the main gate 49 between he or she and the livestock.

The transverse bar 104 in the back enclosure 3 likewise prevents animals from backing up since it is braced against swinging movement in a counterclockwise direction past ninety degrees with respect to the passage 95. The auxiliary gate 63 and the back enclosure gates 102 provide access to animals in the device 1. When the main gate 49 is swung to its position as shown in FIG. 6, the last animal will have been forced out of the front enclosure 2 and into the back enclosure passage 95. The operator can exit the front enclosure 2 through the auxiliary gate 63 and follow the animals from alongside the back enclosure 3. The cam assembly 54 can then safely be released by disengaging the engagement bar 59 from the convex side wall panel 37, whereby the main gate 49 can be returned counterclockwise to either the travel position as shown in phantom in FIG. 6 or to an open position for another group of animals.

The animal working device 1 is tranformable from its working configuration to its transport configuration by reversing the aforementioned procedure. A variety of other livestock working equipment can be used in conjunction with the animal working device 1. For example, a squeeze chute with a head gate can be mounted on the extension base 108 in communication with the open back end 76 of the back enclosure 3. Squeeze chutes are used for immobilizing animals for various types of treatment. Other types of equipment that can be mounted on the extension base 108 include scales for weighing the animals and loading chutes for loading them into trucks, railroad cars, etc.

It is to be understood that while certain forms of the present invention have been illustrated and described herein, it is not to be limited to the specific forms or arrangement of parts described and shown.

What is claimed and desired to be secured by letters patent is as follows:

1. An animal working device, which comprises:
   (a) a first enclosure including a first end, a second end with an opening, opposite sides, a base and a superstructure;
   (b) a second enclosure extending through said first enclosure second end opening and telescopically received in said first enclosure, said second enclosure including first and second ends, opposite sides, a base and a superstructure;
   (c) said second enclosure being movable between retracted and extended positions with respect to the first enclosure;
   (d) elevation means adapted for raising and lowering said device between a work position on a ground surface and a transport position raised above said ground surface;
   (e) said first enclosure having a convex side wall assembly enclosing said first end and one of said sides; and
   (f) a gate on said first enclosure for selectively providing access thereto, said gate being swingable through an arc of movement bounded by said convex side wall assembly.

2. The device according to claim 1 wherein said elevation means includes:
   (a) a retractable undercarriage mounted on said first enclosure base.

3. The device according to claim 2 wherein said elevation means includes:
   (a) a tongue assembly mounted on said first enclosure, said tongue assembly being pivotable about a horizontal axis; and
   (b) a jack assembly mounted on said second enclosure and movable between extended and retracted positions for raising and lowering said second enclosure between a work position on a ground surface and a transport position thereover.

4. The device according to claim 1, which includes:
   (a) a track mounted on one of said enclosures; and
   (b) a roller assembly mounted on the other said enclosure and rollingly engaging said track.

5. The device according to claim 1, which includes:
   (a) a cam assembly adapted to selectively prevent reverse swinging of said gate.

6. The device according to claim 1, which includes:
   (a) a tongue assembly mounted on said first enclosure first end and including a hitch.

7. The device according to claim 1 wherein:
   (a) said second enclosure includes an extension base frame for mounting a piece of animal working equipment.

8. An animal working device which comprises:
   (a) a front enclosure including:
      (1) a front end;
      (2) a back end with an opening;
      (3) a substantially straight side;
      (4) a convex side;
      (5) a base including a frame and a deck;
      (6) a vertical gate post approximately centered along said straight side;
      (7) a straight side wall assembly extending from said gate post to said back end;
      (8) a convex wall assembly extending along said convex side, said convex wall assembly enclosing said front end and said convex side;
      (9) a main gate including a hinged side hingedly attached to said gate post and a free side, said main gate having a pivotal axis adjacent said gate post and said convex wall assembly being spaced substantially equidistant from said pivotal axis and said gate being swingable through said front enclosure with said gate free edge spaced closely to said convex wall assembly; and
      (10) a cam assembly mounted on said main gate adjacent said main gate free side, said cam assembly including a pivot shaft pivotally mounted on said main gate and a cam bracket extending laterally from said pivot shaft, said cam bracket protruding outwardly from said main gate free side and adapted to selectively engage said convex wall assembly and restrain said main gate against said movement in a forward direction;

(b) a back enclosure including:
  (1) an open front end;
  (2) an open back end;
  (3) opposite sides;
  (4) a base including a frame and a deck;
  (5) a skeletal framework mounted on and extending upwardly from said base;
  (6) a pair of side wall assemblies each mounted on said skeletal framework adjacent a respective side;
  (7) a passage extending between said ends and between said sides; and
  (8) a pair of gates each mounted at a respective side and providing access to said passage;

(c) a tongue assembly including:
  (1) a pivot tube pivotally mounted on said front enclosure base frame at said front enclosure front end;
  (2) a tongue extending forwardly from said pivot tube;
  (3) a hitch mounted on said tongue; and
  (4) a double-acting fluid power cylinder connected at one end to said tongue and at its other end to said front enclosure at the front end thereof, said cylinder being adapted to raise and lower said tongue assembly;

(d) an undercarriage including:
  (1) a pivot tube pivotally mounted on said front enclosure base frame adjacent said front enclosure back end, said pivot tube having opposite ends;
  (2) a pair of wheel arms each mounted on a respective pivot tube end and extending forwardly therefrom;
  (3) a pair of wheels each mounted on a respective wheel arm and positioned adjacent a respective front enclosure side;
  (4) a pair of stop pin brackets each mounted on said front enclosure base adjacent a respective side thereof;
  (5) a pair of stop pins each selectively receivable in a respective wheel arm and a respective stop pin bracket for retaining said undercarriage in an extending position;
  (6) an undercarriage lever mounted on and extending rearwardly from said pivot tube;
  (7) a double-acting fluid power cylinder connected at one end to said undercarriage lever and the other end to said front enclosure a the back end thereof;

(e) an alleyway jack assembly including:
  (1) a pivot tube mounted transversely on said back enclosure base frame adjacent said back enclosure back end;
  (2) a pair of jack tubes mounted on and extending from said pivot tube;
  (3) a pair of cylinder mounting plates each mounted on a respective jack tube and extending downwardly therefrom;
  (4) a cylinder mounting rod extending between said cylinder mounting plates in spaced relation below said pivot tube; and
  (5) a double-acting fluid power cylinder connected at one end to said cylinder mounting rod and at its other end to said back enclosure base frame, said cylinder being adapted for extending and retracting said jack assembly;

(f) a pair of longitudinally-extending tracks each mounted on said front enclosure skeletal frame and extending between its front and back ends;

(g) a pair of roller assemblies mounted on said back enclosure skeletal framework adjacent said back enclosure front end, each said roller assembly rollerably engaging a respective track; and enclosure extending through said front (h) said back enclosure extending through said front enclosure back end opening and telescopically receivable in said front enclosure.

9. An animal working device, which comprises:
(a) a front enclosure including:
  (1) a front end;
  (2) a back end with an opening;
  (3) opposite sides;
  (4) a base;
  (5) a superstructure; and
  (6) a gate swingable between an open position admitting access to said front enclosure and a closed position;
(b) a back enclosure including:
  (1) a front end with an opening;
  (2) a back end;
  (3) opposite sides;
  (4) a base;
  (5) a superstructure including opposite side wall assemblies at said opposite sides; and
  (6) a passage extending longitudinally through said back enclosure between its front and back ends and between its opposite side wall assemblies;
(c) a longitudinally-extending track mounted on one of said enclosures;
(d) a roller assembly mounted on the other said enclosure engaging said track; and
(e) said back enclosure extending through said front enclosure back end opening and being telescopically receivable in said front enclosure and movable between extended and retracted positions with respect thereto, said back enclosure open front end being accessible from said front enclosure with said back enclosure in its extended position;
(f) an elevation system adapted to raise and lower said device between a work position on a ground surface and a transport position elevated above a ground surface, said elevation system including a retractable undercarriage mounted on said front enclosure back end and movable between extended and retracted positions, said undercarriage including:
  (1) a pivot tube pivotably mounted on said front enclosure base at the back end of said front enclosure, said pivot tube being pivotable about an axis extending transversely with respect to said front enclosure and having opposite ends;
  (2) a pair of wheel arms each mounted on and extending longitudinally from a respective pivot tube end;
  (3) a pair of wheels each rotatably mounted on a respective wheel arm;

(4) a lever projecting from said pivot tube; and (5) a double-acting, fluid power cylinder extending between said front enclosure superstructure and said lever, said cylinder being adapted for extending and retracting said undercarriage;

(g) a pair of undercarriage stop pin brackets each mounted adjacent a respective front enclosure side; and (h) a pair of undercarriage stop pins each selectively receivable in a respective wheel arm and a respective stop pin bracket, said stop pins and brackets being adapted to restrain said undercarriage in its extended position.

10. The device according to claim 9 wherein:

(a) said gate is swingable through said front enclosure between a first position extending towards said front enclosure front end and a second position extending towards said front enclosure back end with said back enclosure in its extended position.

11. The device according to claim 9 wherein:

(a) said gate includes a cam assembly adapted to prevent reverse movement of said gate.

12. The device according to claim 9 wherein:

(a) said elevation includes a tongue assembly pivotably mounted on said front enclosure front end, said tongue assembly being adapted for raising and lowering said front enclosure front end.

13. The device according to claim 12 wherein:

(a) said elevation system includes a jack assembly mounted on said back enclosure back end and adapted for raising and lowering said back enclosure back end.

14. The device according to claim 13 wherein:

(a) said elevation system includes a double-acting, fluid power cylinder.

* * * * *